(12) United States Patent
Shouno et al.

(10) Patent No.: US 7,123,183 B2
(45) Date of Patent: Oct. 17, 2006

(54) FM-CW RADAR APPARATUS

(75) Inventors: Masayoshi Shouno, Kobe (JP); Masaki Hitotsuya, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 107 days.

(21) Appl. No.: 10/762,088

(22) Filed: Jan. 20, 2004

(65) Prior Publication Data

US 2004/0150550 A1   Aug. 5, 2004

(30) Foreign Application Priority Data

Jan. 21, 2003   (JP)   ............................. 2003-012175

(51) Int. Cl.
*G01S 13/93* (2006.01)

(52) U.S. Cl. .................... 342/70; 342/74; 342/81; 342/128

(58) Field of Classification Search .......... 342/70–72, 342/123, 455
See application file for complete search history.

(56) References Cited

U.S. PATENT DOCUMENTS

| | | | |
|---|---|---|---|
| 6,018,308 A | | 1/2000 | Shirai |
| 6,034,641 A | | 3/2000 | Kudoh et al. |
| 6,087,975 A | | 7/2000 | Sugimoto et al. |
| 6,246,365 B1 | | 6/2001 | Tokoro |
| 6,266,005 B1 | * | 7/2001 | Schneider .................... 342/123 |
| 6,670,912 B1 | * | 12/2003 | Honda ......................... 342/70 |
| 6,765,523 B1 | * | 7/2004 | Ono ............................. 342/70 |
| 6,896,082 B1 | * | 5/2005 | Asanuma et al. ........... 180/169 |
| 6,972,710 B1 | * | 12/2005 | Matsubara et al. ............ 342/70 |
| 6,972,711 B1 | * | 12/2005 | Shono .......................... 342/92 |
| 6,999,024 B1 | * | 2/2006 | Kumon et al. ................. 342/70 |
| 7,002,512 B1 | * | 2/2006 | Isaji ............................ 342/159 |
| 7,006,033 B1 | * | 2/2006 | Ishii et al. ................... 342/127 |
| 7,023,376 B1 | * | 4/2006 | Kuroda et al. ................. 342/70 |
| 7,034,742 B1 | * | 4/2006 | Cong et al. .................... 342/70 |
| 7,046,167 B1 | * | 5/2006 | Rao et al. .................... 340/903 |
| 2003/0001771 A1 | | 1/2003 | Ono |
| 2004/0150550 A1 | | 8/2004 | Shouno et al. ................. 342/70 |
| 2005/0017891 A1 | * | 1/2005 | Kuroda et al. ................. 342/70 |
| 2005/0174282 A1 | * | 8/2005 | Nakanishi et al. ........... 342/109 |
| 2005/0242986 A1 | * | 11/2005 | Hanawa et al. ............... 342/70 |
| 2006/0092073 A1 | * | 5/2006 | Boecker et al. ............... 342/70 |
| 2006/0109168 A1 | * | 5/2006 | Nakanishi et al. ............ 342/70 |
| 2006/0109169 A1 | * | 5/2006 | Winter et al. ................. 342/70 |

FOREIGN PATENT DOCUMENTS

JP   10-93321   4/1998

(Continued)

*Primary Examiner*—John B. Sotomayor
(74) *Attorney, Agent, or Firm*—Christie, Parker & Hale, LLP (57) ABSTRACT

An FM-CW radar apparatus capable of detecting a stationary object, in particular, an overbridge, located above the road ahead in a simple manner uses a traveling wave antenna as a transmitting antenna, and includes a means for varying, in upward and downward directions the projection angle of a combined beam pattern of a transmitted wave radiated from the traveling wave antenna, and an overbridge is detected by varying the projection angle of the combined beam pattern in the upward direction using the varying means. Further, a phase shifter for varying the projection angle of the beam pattern in upward/downward directions by controlling the phase of the radio wave to be transmitted or received is provided on either a transmitting antenna or a receiving antenna or on a transmitting/receiving antenna, and an overbridge is detected by controlling the phase shifter and varying the projection angle of the beam pattern in the upward direction.

3 Claims, 10 Drawing Sheets

FOREIGN PATENT DOCUMENTS

| | | |
|---|---|---|
| JP | 11-14746 | 1/1999 |
| JP | 11-38141 | 2/1999 |
| JP | 11-38142 | 2/1999 |
| JP | 11-287857 | 10/1999 |
| JP | 2000-009831 | 1/2000 |
| JP | 2002-202365 | 7/2002 |

* cited by examiner

FM-CW RADAR APPARATUS

Applicant claims the right to priority based on Japanese Patent Application No. 2003-12175, filed Jan. 21, 2003.

BACKGROUND OF THE INVENTION

1. Field of the Invention

The present invention relates to an FM-CW radar apparatus that uses a frequency-modulated (FM) continuous wave (CW) as a signal for transmission and, more particularly, to an FM-CW radar apparatus that can detect an overbridge, that is, a stationary object such as a bridge, a road sign, a billboard, or the like, located above the road ahead or on the roadside.

2. Description of the Related Art

A scanning radar scans a given area by turning the radar in lateral directions with very fine step angles within a predetermined time. At each step angle, a radar beam is projected from the radar-equipped vehicle toward a vehicle traveling on the road ahead, and the wave reflected from the vehicle ahead is received; the reflected wave thus received is processed to detect the presence of a vehicle ahead and to compute the distance and relative velocity of that vehicle.

With a conventional radar, however, as the beam is scanned in lateral directions as described above, it is difficult to obtain accurate height information. As a result, when an overbridge, that is, a structure such as a bridge over the road ahead, is detected, it may not be possible to clearly identify whether it is really an overbridge or a vehicle traveling ahead.

In one disclosed method (Japanese Unexamined Patent Publication No. 2002-202365), the detected object is determined as being an overbridge candidate when, of the peak frequencies generated based on the reflected radar signal, the number of frequency peaks larger than a predetermined value is not smaller than a predetermined number.

There is also disclosed a radar apparatus that radiates a transmitted wave over a prescribed range of angles in the vehicle width direction and in the height direction, and detects angles in the two directions, i.e., the vehicle width direction and the height direction (Japanese Unexamined Patent Publication Nos. 11-38141 and 11-38142).

SUMMARY OF THE INVENTION

It is an object of the present invention to provide an FM-CW radar apparatus that can detect a stationary object, in particular, an overbridge, located above the road ahead in a simple manner.

The FM-CW radar apparatus of the present invention uses a traveling wave antenna as a transmitting antenna, and includes a means for varying in upward/downward directions the projection angle of a combined beam pattern of a transmitted wave radiated from the traveling wave antenna, and an overbridge can be detected by varying the projection angle of the combined beam pattern in the upward direction using the varying means.

The means for varying the projection angle of the combined beam pattern of the transmitted wave in upward/downward directions is a means for varying the frequency of the transmitted wave, and the means for varying the frequency of the transmitted wave varies the frequency by varying a modulating voltage to be input to a voltage-controlled oscillator that outputs the transmit wave. Further, the means for varying the frequency of the transmitted wave includes a means for switching the modulating voltage to be input to the voltage-controlled oscillator that outputs the transmitted wave, and the projection angle of the beam pattern is varied in upward/downward directions by switching the modulating voltage and thereby switching the frequency of the transmitted wave between an upper band region and a lower band region.

Furthermore, according to the present invention, a phase shifter for varying the projection angle of the beam pattern in upward/downward directions by controlling the phase of the radio wave to be transmitted or received is provided on either a transmitting antenna or a receiving antenna or on a transmitting/receiving antenna, and an overbridge can be detected by controlling the phase shifter and varying the projection angle of the beam pattern in the upward direction.

According to the present invention, as the projection angle of the beam pattern can be varied in the upward direction as described above, an overbridge can be detected without tilting the radar head sensor or the antenna upward and they can be kept stationary.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the radar apparatus of the present invention, the principle of an FM-CW radar will be described.

An FM-CW radar measures the distance to a target object, such as a vehicle traveling ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which power becomes large in correspondence with the target. The frequency corresponding to this peak is called the peak frequency. The peak frequency carries information about distance, and the peak frequency differs between the rising portion and falling portion of the triangular FM-CW wave due to the Doppler effect associated with the relative velocity with respect to the vehicle ahead. The distance and relative velocity with respect to the vehicle ahead are obtained from the peak frequencies in the rising and falling portions. If there is more than one vehicle traveling ahead, a pair of peak frequencies in the rising and falling portions is generated for each vehicle. Forming pairs of peak frequencies in the rising and falling portions is called pairing.

Figure 1A:
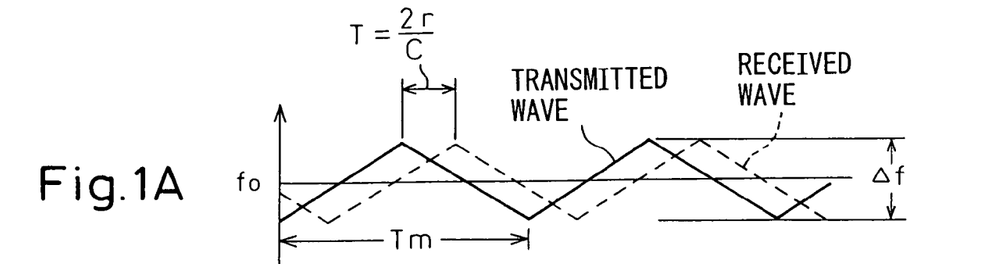
FIGS. 1A, 1B, and 1C are diagrams for explaining the principle of FM-CW radar when the relative velocity with respect to target is 0.
Figure 1B:
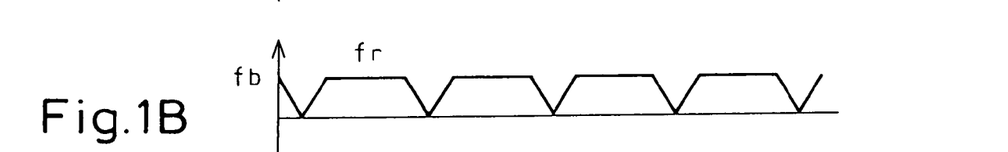
Figure 1C:
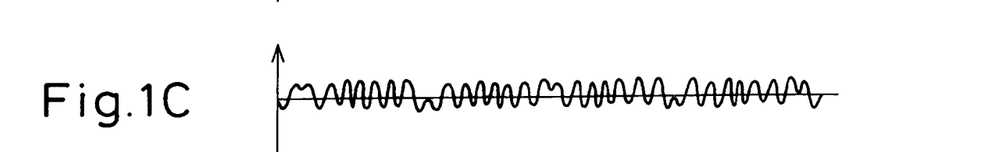

FIGS. 1A, 1B, and 1C are diagrams for explaining the principle of the FM-CW radar when the relative velocity with respect to the target is 0. The transmitted wave is a triangular wave whose frequency changes as shown by a solid line in FIG. 1A. In the figure, f0 is the center frequency of the transmitted wave, Δf is the FM modulation width, and Tm is the repetition period. The transmitted wave is reflected from the target and received by an antenna; the received wave is shown by a dashed line in FIG. 1A. The round trip time T to and from the target is given by T=2r/C, where r is the distance (range) to the target and C is the velocity of radio wave propagation.

Here, the received wave is shifted in frequency from the transmitted signal (i.e., produces a beat) according to the distance between the radar and the target.

FIG. 1B is a diagram showing the beat frequency, and FIG. 1C is a diagram showing the beat signal.

The frequency component fb of the beat signal can be expressed by the following equation.

$$fb = fr = (4 \cdot \Delta f / C \cdot Tm) r$$

where fr is the frequency due to the range (distance).

Figure 2A:
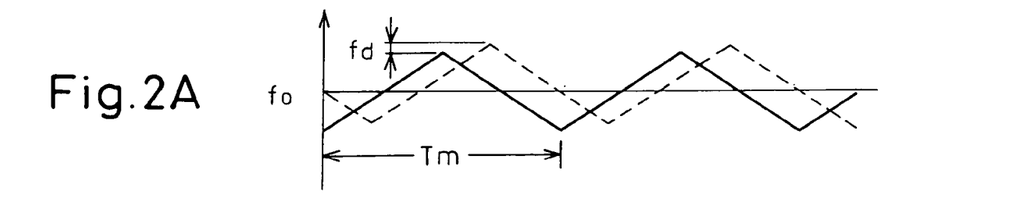
FIGS. 2A, 2B, and 2C are diagrams for explaining the principle of FM-CW radar when the relative velocity with respect to target is v.
Figure 2B:
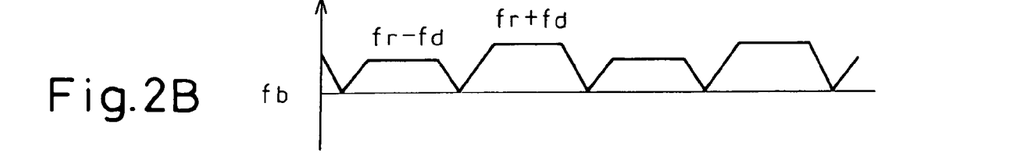
Figure 2C:
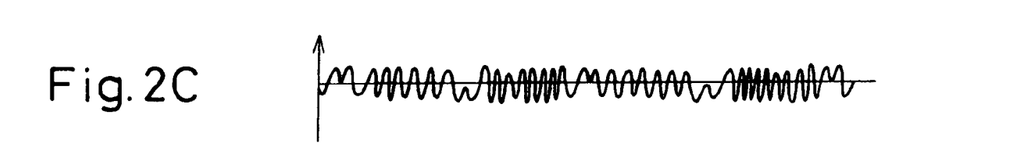

FIGS. 2A, 2B, and 2C, on the other hand, are diagrams for explaining the principle of the FM-CW radar when the relative velocity with respect to the target is v. The frequency of the transmitted wave changes as shown by a solid line in FIG. 2A. The transmitted wave is reflected from the target and received by the antenna; the received wave is shown by a dashed line in FIG. 2A.

Here, the received wave is shifted in frequency from the transmitted signal (i.e., produces a beat) according to the distance between the radar and the target.

FIG. 2B is a diagram showing the beat frequency, and FIG. 2C is a diagram showing the beat signal.

In this case, as the relative velocity with respect to the target is v, a Doppler shift occurs, and the beat frequency component fb can be expressed by the following equation.

$$fb = fr \pm fd = (4 \cdot \Delta f / C \cdot Tm) r \pm (2 \cdot f0 / C) v$$

where fr is the frequency due to the distance, and fd is the frequency due to the velocity.

Figure 3:
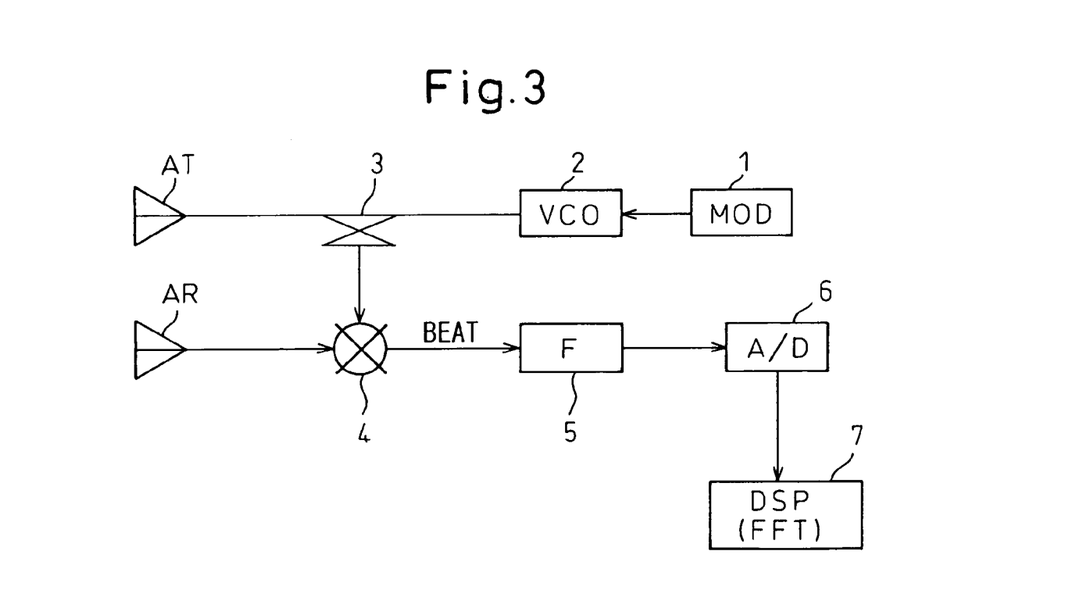
FIG. 3 is a diagram showing one configuration example of a two-antenna FM-CW radar.

The symbols in the above equation have the following meanings.

fb: Transmit beat frequency
fr: Range (distance) frequency
fd: Velocity frequency
f0: Center frequency of transmitted wave
Δf: Frequency modulation width
Tm: Period of modulation wave
C: Velocity of light (velocity of radio wave)
T: Round trip time of radio wave to and from target object
r: Range (distance) to target object
v: Relative velocity with respect to target object FIG. 3 is a diagram showing one configuration example of a two-antenna FM-CW radar. As shown, a modulating signal generator (MOD) 1 applies a modulating signal to a voltage-controlled oscillator (VCO) 2 for frequency modulation, and the frequency-modulated wave is passed through a directional coupler 3 and transmitted out from a transmitting antenna (AT), while a portion of the transmitted signal is separated by the directional coupler 3 and fed into a mixer 4. The signal reflected from the target is received by a receiving antenna (AR), and the received signal is mixed in the mixer 4 with the output signal of the voltage-controlled oscillator (VCO) 2 to produce a beat signal. The beat signal is passed through a filter (F) 5, and is converted by an A/D converter (A/D) 6 into a digital signal; the digital signal is then supplied to a digital signal processor (DSP) 7 where signal processing, such as a fast Fourier transform, is applied to the digital signal to obtain the distance and the relative velocity.

Figure 4:
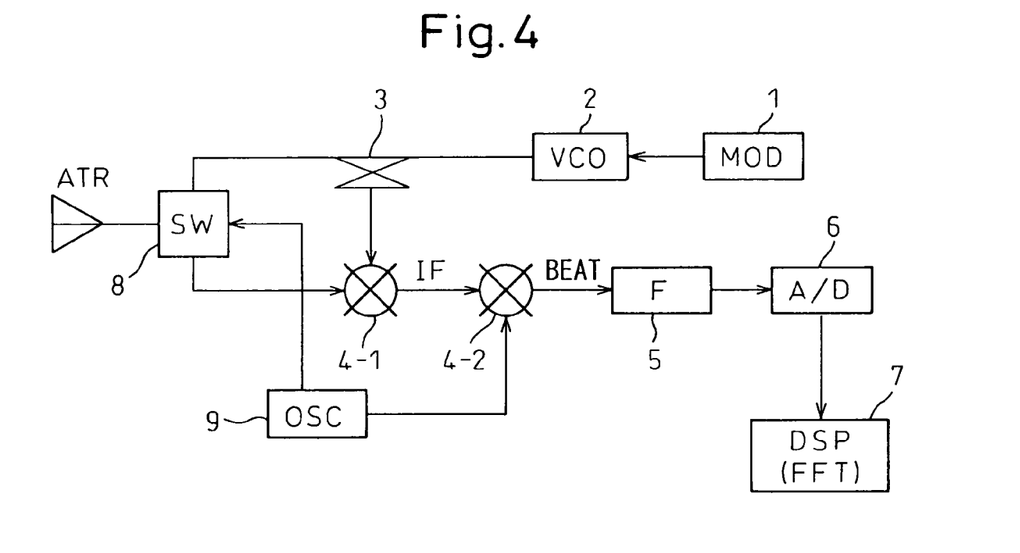
FIG. 4 is a diagram showing one configuration example of a single-antenna FM-CW radar.

FIG. 4 is a diagram showing one configuration example of a single-antenna FM-CW radar. AS shown, a modulating signal generator (MOD) 1 applies a modulating signal to a voltage-controlled oscillator (VCO) 2 for frequency modulation, and the frequency-modulated wave is passed through a directional coupler 3 and transmitted out from a transmitting/receiving antenna (ATR), while a portion of the transmitted signal is separated by the directional coupler 3 and fed into a first mixer 4-1. The signal reflected from the target is received by the transmitting/receiving antenna (ART). SW8 is a transmit-receive switch which switches the antenna between transmission and reception by a signal fed from a transmit-receive switching signal generator (OSC) 9 constructed from an oscillator. The received signal is mixed in the first mixer 4-1 with the output signal of the voltage-controlled oscillator (VCO) 2 to produce an IF signal. The IF signal is mixed in a second mixer 4-2 with the signal from the OSC 9, and is thus downconverted, producing a beat signal. The beat signal is passed through a filter (F) 5, and is converted by an A/D converter (A/D) 6 into a digital signal; the digital signal is then supplied to a digital signal processor (DSP) 7 where signal processing such as a fast Fourier transform is applied to the digital signal to obtain the distance and the relative velocity.

Figure 5A:
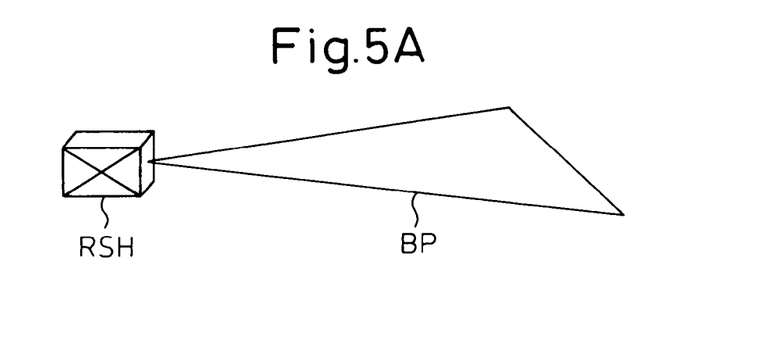
FIGS. 5A and 5B are diagrams showing a prior art method for detecting an overbridge by radar.
Figure 5B:
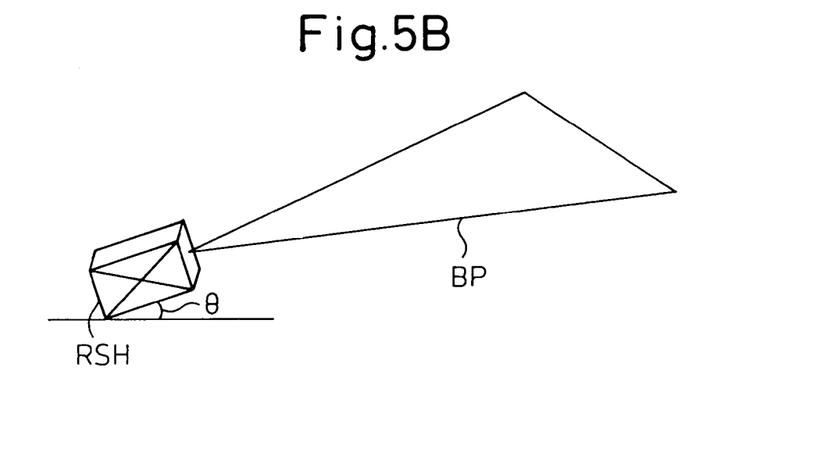

FIGS. 5A and 5B are diagrams showing a prior art method for detecting an overbridge by radar. FIG. 5A shows the normal beam pattern (BP) of the radar beam, the beam pattern being formed in the horizontal direction from a radar sensor head (RSH). FIG. 5B shows the case in which the RSH is tilted upward; in this case, the beam pattern is formed directed obliquely upward, and an overbridge can thus be detected.

Figure 6:
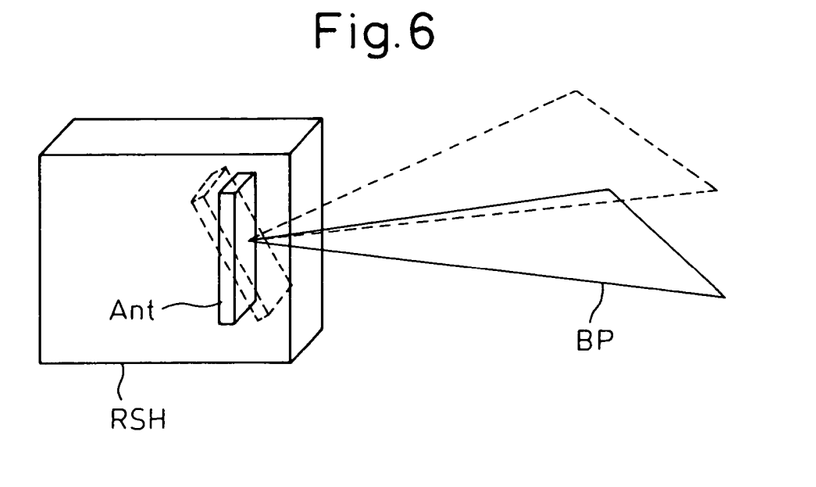
FIG. 6 is a diagram showing another prior art method for detecting an overbridge by radar.

FIG. 6 is a diagram showing another prior art method for detecting an overbridge by radar. According to this method, rather than tilting the radar sensor head (RSH) upward, the antenna is tilted upward to project the beam pattern obliquely upward, as shown in FIG. 6, to detect an overbridge.

Embodiment 1

Figure 7:
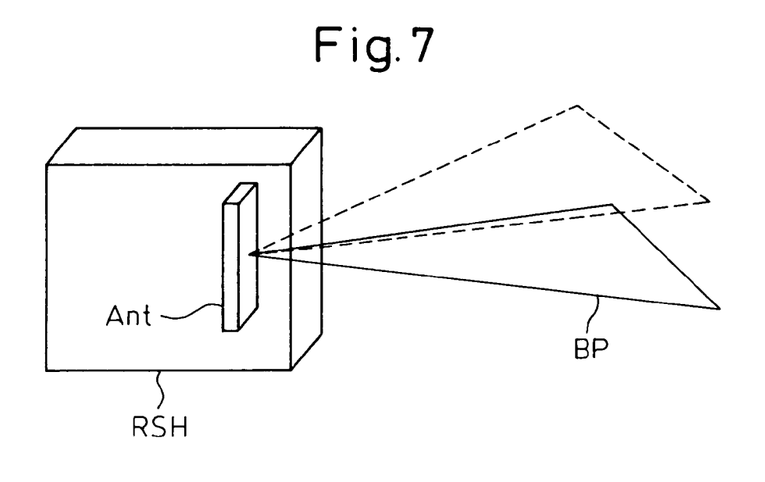
FIG. 7 is a diagram showing a method for forming a radar beam pattern according to the present invention.

FIG. 7 is a diagram showing a method for forming a radar beam pattern according to the radar apparatus of the present invention. As shown, according to the radar apparatus of the present invention, the beam pattern can be formed directed obliquely upward without tilting the radar sensor head or the antenna. In the present invention, the projection angle of the beam pattern can be varied not only in the upward direction but also in the downward direction.

Figure 8:
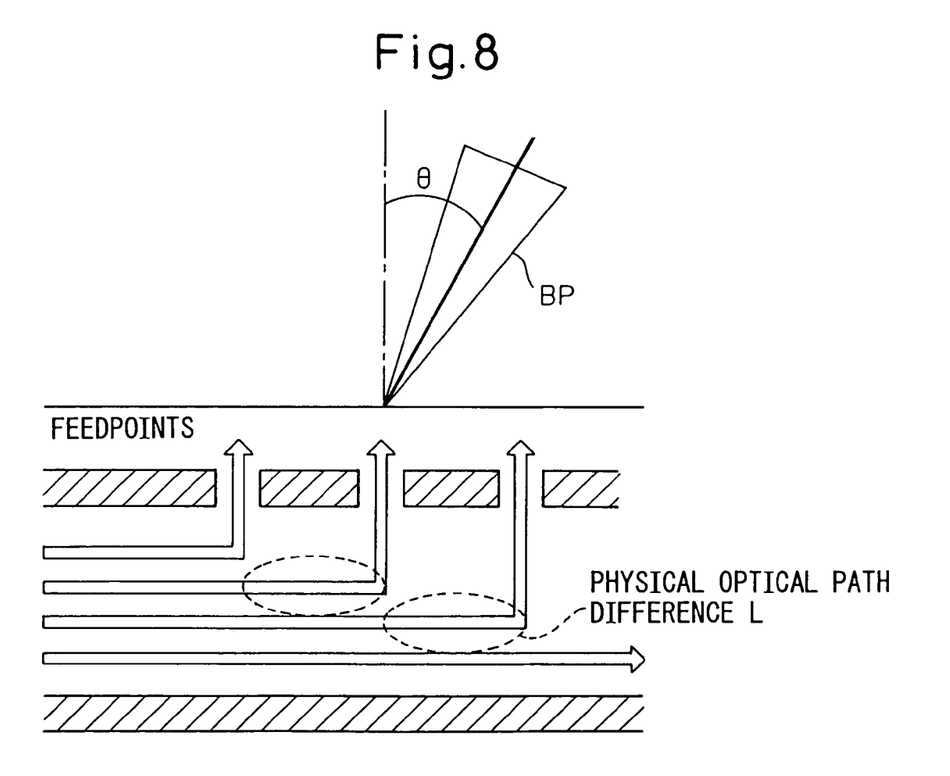
FIG. 8 is a diagram showing the configuration of a traveling wave antenna used in the present invention.

FIG. 8 is a diagram showing the configuration of a traveling wave antenna used in the present invention. According to the radar apparatus of the present invention, when this antenna is used as the transmitting antenna of the FM-CW radar apparatus shown in FIG. 3 or 4, for example, the projection angle of the radar beam pattern can be varied in upward/downward directions by varying the tilt angle θ of the combined beam pattern (BP) radiated from the antenna, without varying the mounting angle of the radar sensor head or the angle of the antenna.

In the case of the antenna shown in FIG. 8, there are three feedpoints, and the physical optical path difference is designated by L. The tilt angle θ of the combined beam pattern varies with the electrical phase. When the wavelength of the transmit wave to be transmitted out from the antenna is denoted by λg, the electrical phase is given by L/λg, which means that the tilt angle θ can be varied by varying the wavelength of the transmit wave, that is, the frequency of the transmitted wave.

Figure 9:
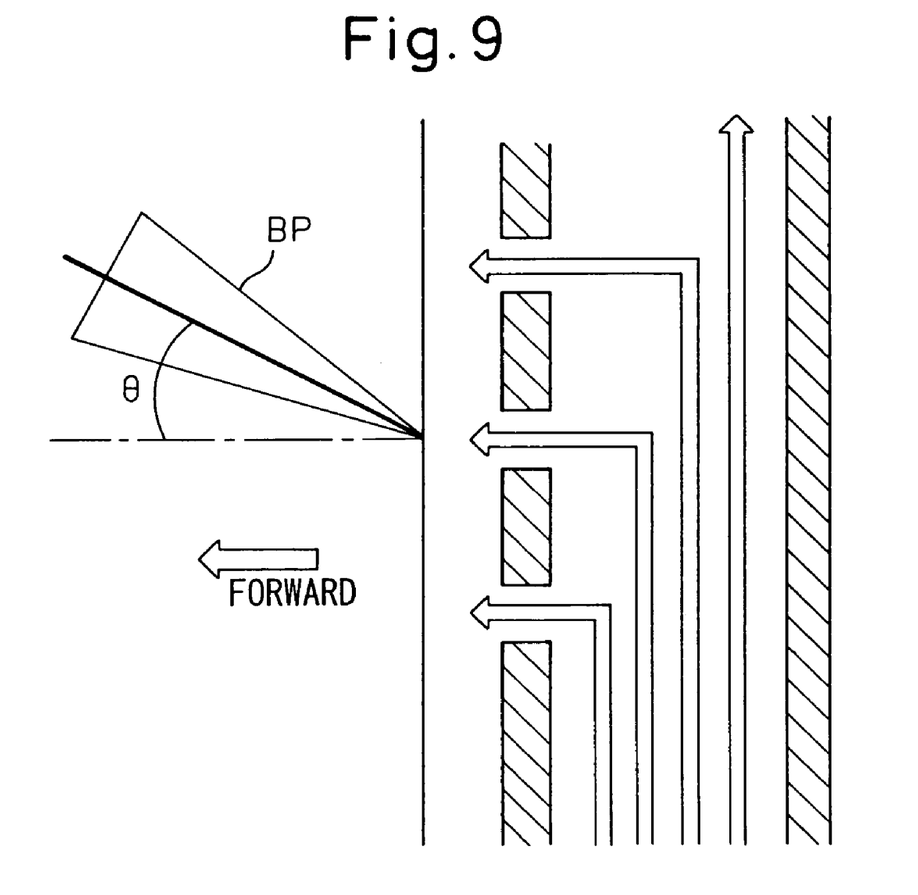
FIG. 9 is a diagram depicting the antenna shown in FIG. 8 when mounted on a radar apparatus.

FIG. 9 is a diagram depicting the antenna shown in FIG. 8 when mounted on the radar apparatus. As shown in FIG. 9, the angle of the combined beam pattern radiated from the antenna can be varied in upward/downward directions by varying the tilt angle θ.

Figure 10A:
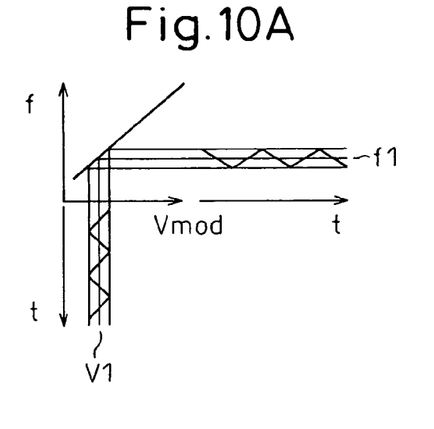
FIGS. 10A, 10B, and 10C are diagrams showing the relationship between the modulating voltage Vmod output from a modulating signal generator (MOD) 1 and the frequency f of the frequency-modulated wave output from a voltage-controlled oscillator (VCO) 2 in FIGS. 3 and 4.
Figure 10B:
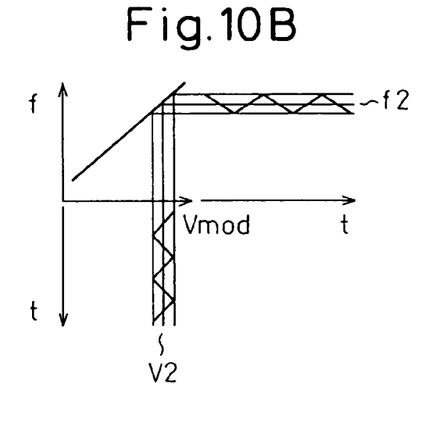
Figure 10C:
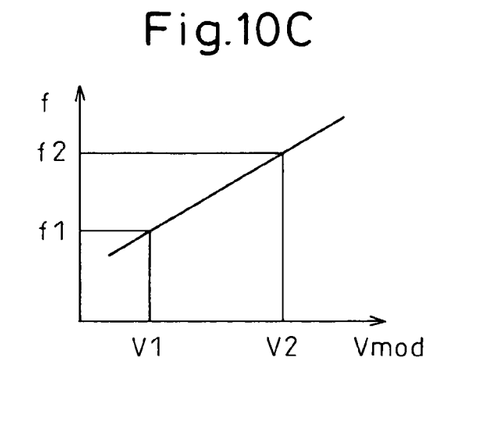

As noted above, the tilt angle θ can be varied by varying the frequency of the transmitted wave. FIGS. 10A, 10B, and 10C are diagrams showing the relationship between the modulating voltage Vmod output from the modulating signal generator (MOD) 1 and the frequency f of the frequency-modulated wave output from the voltage-controlled oscillator (VCO) 2 in FIGS. 3 and 4. As shown in FIG. 10A, when the modulating voltage Vmod of the MOD 1 is a relatively low voltage V1, the frequency f of the frequency-modulated wave output from the VCO 2 is also low.

On the other hand, as shown in FIG. 10B, when the modulating voltage Vmod of the MOD 1 is a relatively high voltage V2, the frequency f of the frequency-modulated wave output from the VCO 2 is also high.

FIG. 10C shows the above relationship. When the modulating voltage Vmod of the MOD 1 is increased from V1 to V2, the frequency f of the frequency-modulated wave output from the VCO 2 increases from f1 to f2 in corresponding fashion.

As described above, by varying the output voltage Vmod of the MOD 1 and thereby switching the frequency of the frequency-modulated wave between the upper region and the lower region within the band, the projection angle of the combined beam pattern can be varied in upward/downward directions.

Figure 11A:
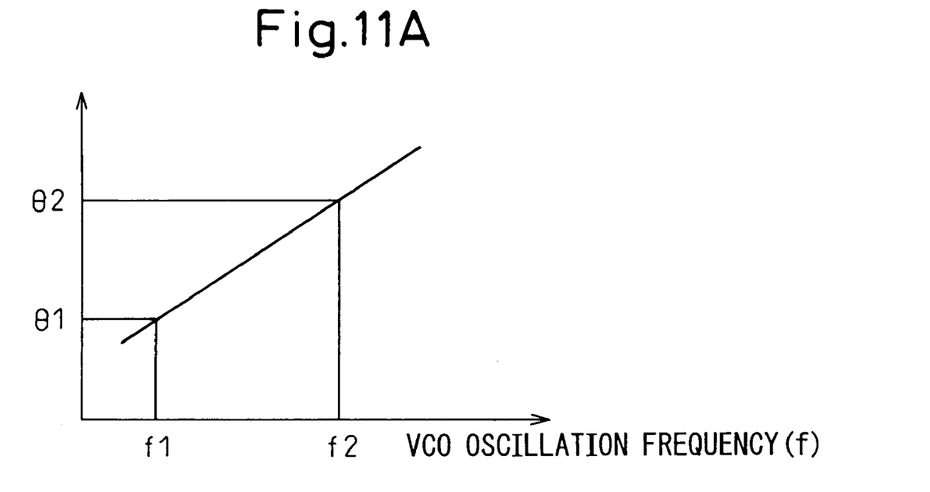
FIGS. 11A and 11B are diagrams showing the relationship between the frequency f of the frequency-modulated wave and tilt angle θ.
Figure 11B:
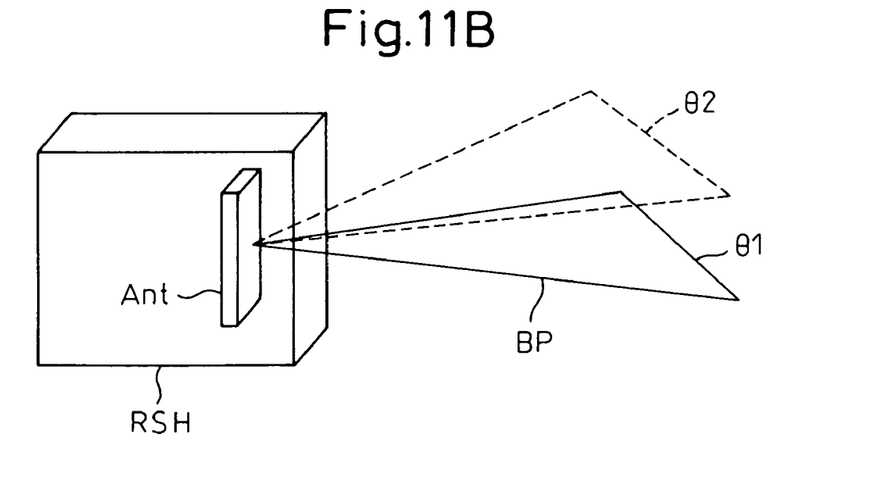

FIGS. 11A and 11B are diagrams showing the relationship between the frequency f of the frequency-modulated wave and the tilt angle θ. As shown in FIG. 11A, when the frequency f of the frequency-modulated wave increases from f1 to f2, the tilt angle θ also increases from θ1 to θ2. FIG. 11B shows how the combined beam pattern varies when the tilt angle θ is varied from θ1 to θ2.

As shown in FIG. 11B, the projection angle of the radar beam pattern can be varied in upward/downward directions without varying the mounting angle of the radar sensor head or the angle of the antenna.

Embodiment 2

Figure 12:
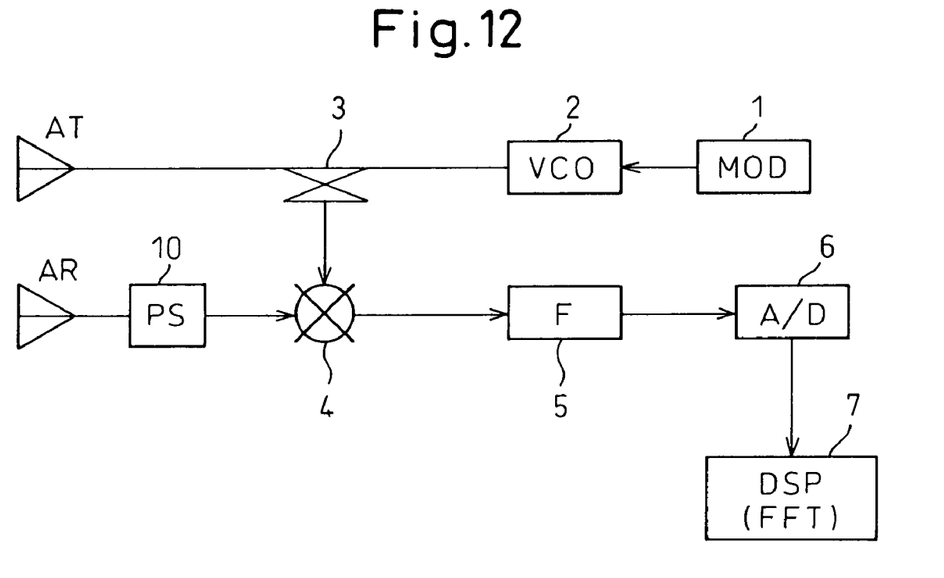
FIG. 12 is a diagram showing an embodiment of a radar apparatus according to the present invention.

FIG. 12 is a diagram showing one configuration example of a two-antenna FM-CW radar according to the present invention. The difference from the configuration shown in FIG. 3 is the inclusion of a phase shifter 10 which is provided between the receiving antenna AR and the mixer 4. Here, the phase shifter may be provided between the transmitting antenna AT and the directional coupler 3.

In the two-antenna radar apparatus shown in FIG. 12, the phase of the radio wave to be transmitted or received is controlled by the phase shifter PS provided on either the transmitting or receiving side, and in this way, the projection angle of the beam pattern can be varied in upward/downward directions while holding the antenna stationary. According to the present invention, an overbridge can be detected by varying the projection angle of the beam pattern in upward/downward directions while holding the antenna stationary.

Figure 13:
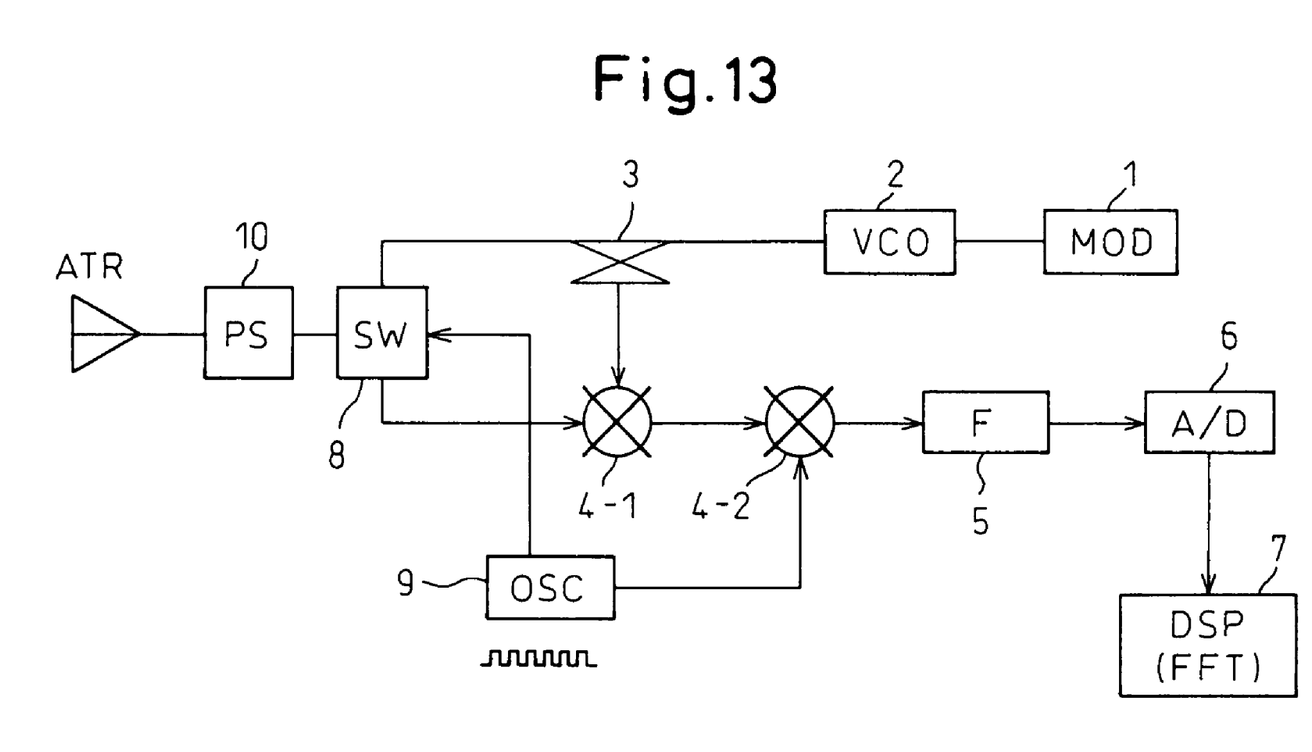
FIG. 13 is a diagram showing an embodiment of a radar apparatus according to the present invention.

FIG. 13 is a diagram showing one configuration example of a single-antenna FM-CW radar according to the present invention. The difference from the configuration shown in FIG. 4 is the inclusion of a phase shifter 10 which is provided between the transmitting/receiving antenna ATR and the transmit-receive switch.

In the single-antenna radar apparatus of FIG. 13 also, by providing the phase shifter PS on the transmitting/receiving antenna ATR, the projection angle of the beam pattern can be varied in upward/downward directions while holding the antenna stationary, and an overbridge can be detected by varying the projection angle of the beam pattern in upward/downward directions while holding the antenna stationary.

What is claimed is:

1. An FM-CW radar apparatus comprising:
a traveling wave antenna as a transmitting antenna, and
a means for varying the frequency of transmitted waves radiated from said traveling wave antenna,
wherein the projection tilt angle of a combined beam pattern of the transmitted waves is varied in upward/downward directions by varying the frequency of the transmitted waves radiated from said traveling wave antenna.

2. The FM-CW radar apparatus as claimed in claim 1, wherein said means for varying the frequency of transmitted waves varies said frequency by varying a modulating voltage to be input to a voltage-controlled oscillator that outputs said transmitted waves.

3. The FM-CW radar apparatus as claimed in claim 1, wherein said means for varying the frequency of said transmitted waves includes a means for switching a said modulating voltage to be input to a voltage-controlled oscillator that outputs said transmitted waves, and wherein the frequency of said transmitted waves is switched between an upper band region and a lower band region by switching said modulating voltage.

* * * * *

UNITED STATES PATENT AND TRADEMARK OFFICE
CERTIFICATE OF CORRECTION

PATENT NO. : 7,123,183 B2
APPLICATION NO. : 10/762088
DATED : October 17, 2006
INVENTOR(S) : Shouno et al.

It is certified that error appears in the above-identified patent and that said Letters Patent is hereby corrected as shown below:

On the Title Page

Item (56) References Cited         Delete "Bl",
U.S. Patent Documents              Insert --B2--
6,670,912. . .

Item (56) References Cited         Delete "Bl",
U.S. Patent Documents              Insert --B2--
6,765,523. . .

Item (56) References Cited         Delete "Bl",
U.S. Patent Documents              Insert --B2--
6,896,082. . .

Item (56) References Cited         Delete "Bl",
U.S. Patent Documents              Insert --B2--
6,972,711. . .

Item (56) References Cited         Delete "Bl",
U.S. Patent Documents              Insert --B2--
6,999,024. . .

Item (56) References Cited         Delete "Bl",
U.S. Patent Documents              Insert --B2--
7,002,512. . .

Item (56) References Cited         Delete "B1",
U.S. Patent Documents              Insert --B2--
7,034,742. . .

Item (56) References Cited         Delete "B1",
U.S. Patent Documents              Insert --B2--
7,046,167. . .

UNITED STATES PATENT AND TRADEMARK OFFICE
CERTIFICATE OF CORRECTION

PATENT NO. : 7,123,183 B2
APPLICATION NO. : 10/762088
DATED : October 17, 2006
INVENTOR(S) : Shouno et al.

It is certified that error appears in the above-identified patent and that said Letters Patent is hereby corrected as shown below:

Column 6, line 54,   Delete "a said",
                     Insert --a--

Signed and Sealed this

Third Day of July, 2007

JON W. DUDAS
*Director of the United States Patent and Trademark Office*